July 5, 1955
E. E. LYNCH
2,712,610
RADIATION MONITOR
Filed June 26, 1952
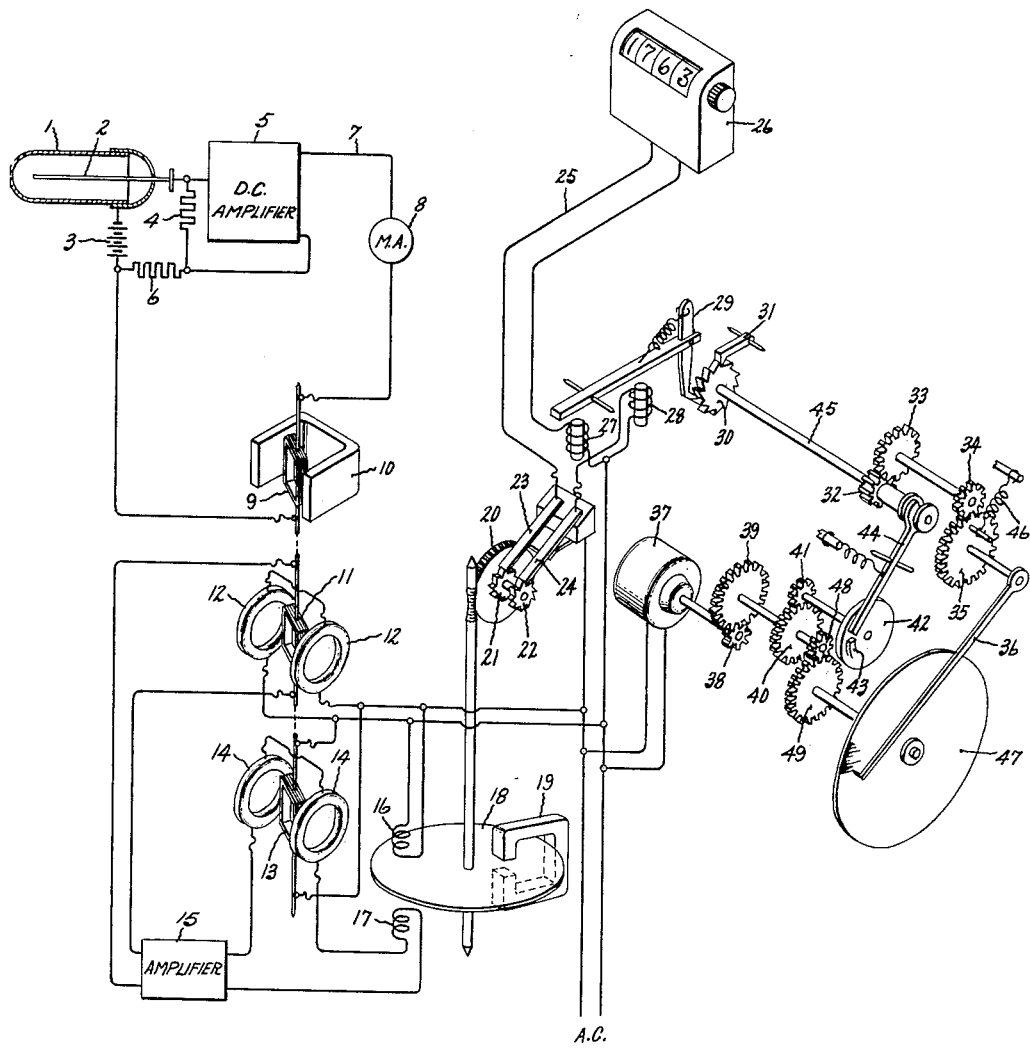
Inventor:
Edward E. Lynch,
by Richard E. Hosley
His Attorney.

United States Patent Office 2,712,610
Patented July 5, 1955

2,712,610

RADIATION MONITOR

Edward E. Lynch, Wakefield, Mass., assignor to General Electric Company, a corporation of New York Application June 26, 1952, Serial No. 295,713

11 Claims. (Cl. 250—83.6)

My invention relates to improved apparatus for monitoring radiation, particularly the hazardous radiations such as gamma rays which may be present in areas where radioactive materials, nuclear research equipments, or the like are employed.

Some prior devices for automatic area radiation monitoring have displayed only instantaneous values of radiation present. While such values are often of interest, integrated values over selected time intervals are more significant from a health hazard standpoint. Other prior devices have displayed integrated radiation values, but these generally provide an inadequate presentation in that no continuous, permanent record is provided, or they employ complex electronic circuits with consequent disadvantages in cost and reliability. Furthermore, the prior devices generally do not provide immediate warning of radiation exposures hazardous to health, and they frequently require reading or interpretation of data by health specialists, thereby providing other workers less assurance of safety than is desirable.

A principal object of my invention is to provide an improved radiation monitor which is simple, relatively inexpensive, and highly reliable, and which displays data in an exceptionally convenient and useful form. Other objects and advantages will appear as the description proceeds.

Briefly stated, in accordance with one aspect of my invention, conventional radiation measuring means are employed to provide an electric current proportional in value to the radiation monitored. A current-responsive electrical instrument may be connected to display instantaneous values of this current. The primary purpose of such an instrument is to indicate radiation levels of sufficiently great magnitude to be a health hazard for even brief exposures. Since weaker radiations, which are hazardous only upon longer exposures, are indicated by other means hereinafter described, the current-responsive instrument can be of a simple type, and scale-changing arrangements are not required. This is very advantageous, not only because of circuit simplicity, but also because the instrument indications are unequivocal and do not require multiplication by scale factors. If desired, an alarm mechanism may be associated with this instrument to give a warning when instantaneous radiation values reach immediately dangerous levels.

To integrate the weaker radiation values, I provide apparatus comprising a torque-balance converter which provides electric power proportional in value to the electric current provided by the detection means. This electric power operates an induction motor of the watt-hour meter type having a rotor which turns at a speed proportional to the electric power, and hence proportional to the radiation monitored. As the rotor turns, it repetitively closes a set of electrical contacts, thereby providing, in an associated circuit, a series of electric impulses having a repetition rate proportional to the radiation value. A manually resettable counter may be provided to totalize and display the number of such impulses over any desired time interval. Thus, the value displayed by the counter is proportional to the integrated, or exposure, value of radiation present since the counter was last reset. In use, the counter may be manually reset at the beginning of each week, day, or work shift, for example, and thereafter will continuously indicate the total radiation exposure in the monitored area during that period. An alarm may be attached to the counter, to give a warning when the count exceeds safe limits for the period.

Further means are provided for automatically integrating radiation values over successive predetermined intervals, usually fifteen minutes, and making a permanent graphical record of such values. To accomplish this, I provide a recording register of the demand meter type comprising a ratchet wheel, with electromagnetic means for rotating the ratchet wheel forward stepwise in response to the electric impulses provided. As the ratchet wheel turns, it displaces, stepwise, a recording pen, so that the pen position represents radiation exposure values. Periodically, at the end of each fifteen minute interval, a timing motor disengages the recording pen from the ratchet wheel, and the pen is returned to its initial position by spring biasing means. Still another alarm may be added, if desired, to give a warning whenever the pen position indicates a 15 minute exposure in excess of safe tolerance levels.

The pen movements may be recorded on a conventional paper chart, thus providing a convenient, permanent, continuous record of radiation exposures during each fifteen minute interval. Since the chart can move at quite slow speeds, the record for an entire month can be placed upon a single round chart record, so that a complete record of radiation exposures for one month can be reviewed at a glance to determine both the arithmetic average of radiation exposures in the area and the significant variations of exposure with time.

My invention will be better understood from the following description taken in connection with the accompanying drawing, and its scope will be pointed out in the appended claims.

In the drawing, the single figure is a schematic diagram illustrating a preferred form of my invention.

Referring to the drawing, the primary detector for the radiation to be monitored preferably is an ionization chamber having an outer electrode 1 and an inner electrode 2. An electric potential is maintained between the outer and inner electrodes by suitable means, such as a battery 3. As is well known, the presence of hazardous radiations causes a small electric current to flow between electrodes 1 and 2, and therefore through a load resistor 4. This feeble current is amplified to a more convenient magnitude by a conventional direct-current amplifier 5. For stability, a feedback resistor 6, which is common to both the input and the output circuits of the amplifier, is provided in the customary manner. This substantially conventional arrangement provides in the output circuit 7 of the amplifier a unidirectional electric current which is proportional in value to the radiation monitored.

Other primary detectors of radiation may be employed in place of the ionization chamber. For example, a Geiger tube may be used so connected that its output controls a conventional rate meter providing in circuit 7 a direct current proportional to the Geiger tube counting rate.

A current-responsive electrical instrument 8 is connected to display instantaneous values of this current, and hence instantaneous values of the radiation monitored. Instrument 8 can be a simple, conventional milliammeter, preferably calibrated in terms of milliroentgens of radiation per hour.

A torque-balance converter, of a previously known type, is used to provide electric power proportional in value to the electric current in circuit 7. The torque-balance converter comprises a first instrument mechanism having a rotatable coil 9 and a permanent magnet field structure 10. Coil 9 is series-connected in circuit 7, as shown, so that the current flowing therein produces a torque on the rotatable coil which is proportional to the magnitude of the current.

The torque-balance converter also comprises a second instrument mechanism having a rotatable coil 11 and an electromagnetic field structure 12, and a third instrument mechanism having a rotatable coil 13 and an electromagnetic field structure 14. The rotatable coils 9, 11 and 13 are mechanically connected together, so that they rotate in unison. Field 12 is energized with alternating current from any suitable source, so that alternating voltage is induced in coil 11 having a value which depends upon the angular position of the coil. This induced voltage is amplified by a conventional amplifier 15 and then applied to energize the field 14. Coil 13 is energized with alternating current.

It will be noted that coil 13 and electromagnetic field structure 14 essentially constitute a wattmeter element, assuming that the energization of coil 13 represents electric voltage, while the energization of field 14 represents electric current. A torque is produced on coil 13 which is proportional to the electric power represented by this voltage and current. The torques acting on coils 9 and 13 are in opposite directions, and the torque-balance converter operates to equalize these torques in the following manner: Assume, for example, that the value of current flowing in circuit 7 is such that the torque upon coil 9 is momentarily greater than the torque upon coil 13. The torques are now unbalanced, and the three coils 9, 11 and 13, being mechanically connected together, all rotate. This rotation is such that a larger alternating voltage is induced in coil 11, whereby a larger current is applied to field 14. This represents an increase in electric power, which increases the torque upon coil 13. Such rotation continues until the two torques are just balanced. Thus, the converter acts to provide automatically an electric power exactly proportional to the electric current in circuit 7.

An induction motor of the watthour meter type comprises a potential coil 16, a current coil 17, a rotor 18, and a drag magnet 19. Coil 16 is connected in parallel circuit with coil 13, and coil 17 is connected in series circuit with field 14, as shown. Thus, the electric power acting upon the induction motor is exactly the same as the electric power which produces torque on coil 13. This causes rotor 18 to turn, as is well known, at a speed proportional to this electric power, and hence proportional to the value of radiation monitored.

As rotor 18 turns, it rotates a gear 20 attached to beveled cams 21 and 22, which in turn repetitively open and close, in alternate sequence, two sets of electrical contacts 23 and 24 at a rate proportional to the rotor speed. At each closing of contacts 23, an electric impulse is produced in the circuit 25. A manually resettable impulse counter 26, of conventional design, is connected to totalize and display the number of these impulses.

Also connected in circuit 25, and thus responsive to the same electric impulses, is an electromagnet 27. Another electromagnet 28 is connected in series circuit with contacts 24, as shown. Each time that contacts 24 close, electromagnet 28 operates the ratchet mechanism 29 to rotate a ratchet wheel 30 one step forward. Then, as contacts 24 are opened and contacts 23 close, electromagnet 27 retracts the ratchet mechanism into position for the next stepwise rotation. A pawl 31 prevents reverse rotation of the ratchet wheel. This arrangement comprising two sets of contacts and two electromagnets which respectively advance and retract the ratchet mechanism prevents incorrect advancement of the ratchet wheel which could otherwise occur due to contact vibration or chatter.

Rotation of the ratchet wheel 30 is transmitted through gears 32, 33, 34 and 35 to displace a chart recorder pen arm 36 stepwise a fixed amount in response to each closing of contacts 24. Thus, the position of pen arm 36 represents an integrated radiation value.

A small, synchronous timing motor 37, acting through gears 38, 39, 40 and 41 rotates a disk 42 at a speed of four revolutions per hour, or one revolution each fifteen minutes. Disk 42 has a raised cam portion 43, which once each fifteen minutes presses the lower end of a lever 44 outward, thereby moving gear 32 inward along shaft 45 and disengaging gears 32 and 33. This disengages the pen arm 36 from the ratchet wheel 30, and permits the pen arm to be reset to its initial position by a biasing spring 46. Thus, once each fifteen minutes, the recording pen is reset to its initial position. Then, it is advanced stepwise by the ratchet wheel 30 to integrate radiation values over a fifteen minute interval until it is again reset.

Movements of the pen arm 36 may be recorded upon a conventional paper chart 47, which may be rotated at a slow, fixed speed by timing motor 37 acting through gears 38, 39, 48 and 49.

It will be understood that my invention is not limited to the specific embodiment herein illustrated and described, and that the following claims are intended to cover all changes and modifications which do not depart from the true spirit and scope of the invention.

What I claim as new and desire to secure by Letters Patent of the United States is:

1. A radiation monitor comprising means providing an electric current proportional in value to the radiation monitored, means responsive to said current providing successive electric current pulses at rates proportional to the values of said current, timed means, and means responsive to said timed means and said current pulses providing indications proportional to the number of said pulses provided during predetermined time intervals.

2. A radiation monitor comprising means providing an electric current proportional in value to the radiation monitored, means responsive to said current providing successive electric current pulses at rates proportional to the values of said current, a ratchet wheel, electromagnetic means to rotate said ratchet wheel by a predetermined angular step in response to each of said current pulses, means recording each step of rotation of said ratchet wheel, and means periodically resetting said recording means automatically to a reference position.

3. A radiation monitor comprising means providing an electric current proportional in value to the radiation monitored, means providing electric impulses at a rate proportional to the value of said current, a ratchet wheel, electromagnetic means to rotate said ratchet wheel forward stepwise in accordance with said impulses, a recording pen, means driven by said ratchet wheel to displace said recording pen stepwise in accordance with rotation of the ratchet wheel, spring biasing means tending to restore said recording pen to its initial position, a timing motor, and means driven by said timing motor for automatically disengaging said recording pen from said ratchet wheel periodically at predetermined time intervals whereby said biasing means periodically resets the recording pen to its initial position after successive time intervals.

4. A radiation monitor comprising means providing an electric current proportional in value to the radiation monitored, a torque-balance converter connected to provide electric power proportional in value to said current, said torque balance converter comprising three angularly coupled rotatable coils, a first stationary permanent magnet field structure for one of said coils, means applying said electric current to said one coil, second and third stationary electromagnetic field structures, alternating voltage means energizing said second field structure and a third one of said coils, a second one of said coils being positioned to have electrical signals induced therein by said second field structure, and means applying electric power to said third field structure responsive to said signals, an induction motor of the watthour meter type having a rotor and being connected for rotor rotation at a speed proportional to the value of said electric power, and means displaying values proportional to the number of rotations of said rotor during predetermined time intervals.

5. A radiation monitor comprising means providing an electric current proportional in value to the radiation monitored, a torque-balance converter connected to provide electric power proportional in value to said current, an induction motor of the watt-hour meter type having a rotor and being connected for rotor rotation at a speed proportional to the value of said electric power, a set of electrical contacts, mechanism driven by said rotor to close said contacts repetitively at a rate proportional to the rotor speed, circuit means to provide an electric impulse at each closing of said contacts, and means displaying values proportional to the number of said impulses provided during predetermined time intervals.

6. A radiation monitor comprising means providing an electric current proportional in value to the radiation monitored, a first instrument mechanism having a rotatable element and providing a torque proportional in value to said current, means providing electric power related in value to the angular position of the rotatable element of said first instrument mechanism, another instrument mechanism having a rotatable element and providing a torque proportional in value to said power, the two torques being in opposite directions and the rotatable elements of said instrument mechanisms being mechanically connected together so that the opposing torques balance and the electric power provided is automatically adjusted to values proportional to said current, an induction motor of the watt-hour meter type having a rotor and being connected for rotor rotation at a speed proportional to the value of said electric power, and means displaying values proportional to the number of rotations of said rotor during predetermined time intervals.

7. A radiation monitor comprising means providing a unidirectional electric current proportional in value to the radiation monitored, a first instrument mechanism having a rotatable coil and a permanent magnet field structure, the coil of said first mechanism being so connected that said unidirectional current flows therein and produces a torque on such coil proportional in value to said current, a second instrument mechanism having a rotatable coil and an electromagnetic field structure, circuit means for energizing the field structure of said second mechanism with alternating current so that there is induced in the rotatable coil of said second mechanism an alternating voltage related in value to the angular position of such coil, a third instrument mechanism having a rotatable coil and an electromagnetic field structure, circuit connections for energizing the rotatable coil of said third mechanism with alternating current, means for amplifying the voltage induced in the rotatable coil of said second mechanism and applying the amplified signal to energize the field structure of said third mechanism, the rotatable coils of said first, second and third instrument mechanisms being mechanically connected to rotate together, whereby the respective torques of said first and third mechanisms are balanced and the electric power corresponding to the field and coil excitation currents of said third mechanism is automatically adjusted to a value proportional to said unidirectional current, an induction motor of the watt-hour meter type having a potential coil, a current coil, and a rotor, said potential coil being connected in parallel circuit with the rotatable coil and said current coil being connected in series circuit with the field of said third instrument mechanism, whereby said rotor rotates at a speed proportional to said electric power, and means displaying values proportional to the number of rotations of said rotor during predetermined time intervals.

8. A radiation monitor comprising an ionization chamber and an amplifier providing an electric current proportional in value to the radiation monitored, means responsive to said current providing successive electric current pulses at rates proportional to the values of said current, timed means, and means responsive to said timed means and said current pulses providing indications proportional to the number of said pulses provided during predetermined time intervals.

9. A radiation monitor comprising an ionization chamber and an amplifier providing an electric current proportional in value to the radiation monitored, a first instrument mechanism having a rotatable element and providing a torque proportional in value to said current, means providing electric power related in value to the angular position of the rotatable element of said first instrument mechanism, another instrument mechanism having a rotatable element and providing a torque proportional in value to said power, the two torques being in opposite directions and the rotatable elements of said instrument mechanisms being mechanically connected together so that the opposing torques balance and the electric power provided is automatically adjusted to values proportional to said current, an induction motor of the watt-hour meter type having a rotor and being connected for rotor rotation at a speed proportional to the value of said electric power, a set of electric contacts, mechanism driven by said rotor to close said contacts repetitively at a rate proportional to the rotor speed, circuit means to provide an electric impulse at each closing of said contacts, a ratchet wheel, electromagnetic means to rotate said ratchet wheel stepwise in response to said impulses, recording means displaced stepwise by rotation of said ratchet wheel, and means periodically to reset said recording means automatically to its initial position.

10. A radiation monitor comprising means providing an electric current proportional in value to the radiation monitored, means providing successive electric current pulses at rates proportional to the values of said current, timed means, automatic recording means responsive to said timed means, and said current pulses providing recorded indications proportional to the number of said pulses provided during predetermined successive time intervals, a current-responsive electrical instrument connected to display instantaneous values of said current, and a pulse counter connected to totalize and display the number of said current pulses.

11. A radiation monitor comprising an ionization chamber and an amplifier providing an electric current proportional in value to the radiation monitored, a first instrument mechanism having a rotatable element and providing a torque proportional in value to said current, means providing electric power related in value to the angular position of the rotatable element of said first instrument mechanism, another instrument mechanism having a rotatable element and providing a torque proportional in value to said power, the two torques being in opposite directions and the rotatable elements of said instrument mechanisms being mechanically connected together so that the opposing torques balance and the electric power provided is automatically adjusted to values proportional to said current, an induction motor of the watt-hour meter type having a rotor and being connected for rotor rotation at a speed proportional to the value of said electric power, a set of electrical contacts, mechanism driven by said rotor to close said contacts repetitively at a rate proportional to the rotor speed, circuit means to provide an electric impulse at each closing of said contacts, a ratchet wheel, electromagnetic means to rotate said ratchet wheel one step forward for each of said impulses, recording means, means driven by said ratchet wheel to displace said recording means stepwise in accordance with rotation of the ratchet wheel, biasing means tending to restore said recording means to its initial position, a timing motor, means driven by said timing motor for automatically disengaging said recording means from said ratchet wheel once each successive predetermined time interval, whereby said biasing means periodically resets the recording means to its initial position, a current-responsive electrical instrument connected to display instantaneous values of said current, and a manually resettable impulse counter connected to totalize and display the number of said impulses.

References Cited in the file of this patent

UNITED STATES PATENTS

| | | |
|---|---|---|
| 1,603,049 | Hall | Oct. 12, 1926 |
| 2,189,623 | Bourland | Feb. 6, 1940 |
| 2,566,868 | Allia | Sept. 4, 1951 |
| 2,590,459 | Pudelko | Mar. 25, 1952 |
| 2,598,899 | Fehr | June 3, 1952 |
| 2,625,656 | Blackmore | Jan. 13, 1953 |